(12) United States Patent
Fleming

(10) Patent No.: US 12,406,566 B2
(45) Date of Patent: Sep. 2, 2025

(54) SMART WRIST BAND

(71) Applicant: Tyneadrian Fleming, Spring Valley, NY (US)

(72) Inventor: Tyneadrian Fleming, Spring Valley, NY (US)

(*) Notice: Subject to any disclaimer, the term of this patent is extended or adjusted under 35 U.S.C. 154(b) by 74 days.

(21) Appl. No.: 18/518,821

(22) Filed: Nov. 24, 2023

(65) Prior Publication Data
US 2024/0177593 A1 May 30, 2024

Related U.S. Application Data

(60) Provisional application No. 63/428,159, filed on Nov. 28, 2022.

(51) Int. Cl.
| | |
|---|---|
| *G08B 25/01* | (2006.01) |
| *G01S 5/02* | (2010.01) |
| *G06F 3/01* | (2006.01) |
| *G06F 3/16* | (2006.01) |
| *G06Q 20/40* | (2012.01) |
| *G06Q 30/0226* | (2023.01) |
| *G06Q 30/0251* | (2023.01) |
| *G08B 21/04* | (2006.01) |
| *G08B 25/12* | (2006.01) |

(52) U.S. Cl.
CPC .......... *G08B 25/016* (2013.01); *G01S 5/0231* (2013.01); *G06F 3/011* (2013.01); *G06F 3/167* (2013.01); *G06Q 20/4016* (2013.01); *G06Q 30/0226* (2013.01); *G06Q 30/0255* (2013.01); *G08B 21/043* (2013.01); *G08B 21/0446* (2013.01); *G08B 25/12* (2013.01)

(58) Field of Classification Search
CPC .................................................... G08B 25/016
See application file for complete search history.

(56) References Cited

U.S. PATENT DOCUMENTS

| | | | | |
|---|---|---|---|---|
| 11,147,511 | B1* | 10/2021 | Mitogo | A61B 5/4845 |
| 11,556,727 | B1* | 1/2023 | Geisler | G06K 7/1417 |
| 2014/0070012 | A1* | 3/2014 | Hunt | G16Z 99/00 |
| | | | | 235/494 |
| 2015/0213203 | A1* | 7/2015 | Cumbie | G16H 10/65 |
| | | | | 705/3 |
| 2019/0228614 | A1* | 7/2019 | Huang | G06Q 30/00 |
| 2019/0378620 | A1* | 12/2019 | Sarén | G16H 50/30 |
| 2021/0210053 | A1* | 7/2021 | Ng | G09G 5/14 |
| 2023/0351364 | A1* | 11/2023 | Colbert | G06Q 20/321 |
| 2023/0359320 | A1* | 11/2023 | Huang | G06F 1/1654 |
| 2024/0281235 | A1* | 8/2024 | Huang | G06F 1/163 |

\* cited by examiner

*Primary Examiner* — Travis R Hunnings
(74) *Attorney, Agent, or Firm* — Michael E. Zall

(57) ABSTRACT

A user assistance system comprising a wearable device that enhances personal safety and health management. The wearable device includes an enclosure with a display screen to display a multidimensional code and an input interface for SOS signals. Additionally, the enclosure includes a geolocation unit and a data transceiver for communication with a mobile terminal. The mobile terminal scans the multidimensional code, establishes a communication link with the wearable device, and receives a user profile. The user profile includes emergency contacts, login details, and medical data. In emergencies, the system activates an SOS protocol, transmits a notification with the location of user to designated recipients, and facilitates response and assistance.

16 Claims, 12 Drawing Sheets

SMART WRIST BAND

RELATED APPLICATION

This application claims priority of provisional application 63/428,159 filed on Nov. 28, 2023. The entire disclosure of this provisional application is incorporated herein by reference.

TECHNICAL FIELD

The present disclosure relates to wearable technology for personal safety and health management, integrating emergency response, health data communication, and geolocation features.

BACKGROUND

In the sphere of personal safety and health management, the intersection of technology and individual well-being is witnessing a paradigm shift. The pursuit of devices that can offer instantaneous support during critical times is intensifying, motivated by a collective desire for security and swift access to medical aid. The trend is a reflection of a society that is increasingly cognizant of the unpredictable nature of health and safety incidents, and the necessity for immediate, reliable response mechanisms.

Personal emergency response systems, historically, have been static, confined to the home, and reliant on the ability of user to reach a stationary communication device. However, as the public space has grown more complex and as lifestyles have become more mobile, the traditional systems are no longer sufficient. Individuals seek the assurance that comes with having a constant, wearable companion, one that can summon help, provide crucial health data, and ensure their whereabouts are known, without intruding upon the routines of daily life.

The contemporary approach to safety is proactive, that is about having the means to signal distress with minimal effort, the assurance that location of user can be immediately pinpointed, and that personal health details are accessible to responders/recipients. The connectivity allows for the seamless transmission of alerts and personal health profiles to appropriate recipients, be they family, friends, or emergency services. The system must respect user privacy while also providing necessary information when consent is given or when an emergency situation overrides such considerations.

The need for real-time data sharing in critical situations has never been more apparent. As populations age and as the desire for independent living grows, so does the need for a system that can support the societal trends. Furthermore, the reality of global travel and the potential for emergencies far from home has amplified the requirement for systems that can transcend geographical boundaries, providing peace of mind to travelers and their loved ones.

The reliance on such systems extends beyond personal emergencies. In the broader context of healthcare management, the ability to track and share health metrics in real-time can facilitate early intervention, preventing emergencies before they occur. The systems, therefore, are not just reactive but increasingly preventive.

Despite the strides made in developing user-centric technologies, the scope for enhancement is vast. The integration of advanced sensors, predictive analytics, and adaptive communication technologies into user assistance systems is an ongoing journey. As the complexity of societal needs grows, so does the imperative for reliable, and accessible technology solutions. Therefore, there is a need for safety solutions, integrating emergency response, and geolocation features.

SUMMARY

The aim of the present disclosure is to provide a user assistance system and a method for providing user assistance through a user assistance system comprising a wearable device and a mobile terminal, for personal safety and health management, integrating emergency response, health data communication, and geolocation features.

In an embodiment, the disclosure presents a user assistance system that includes a wearable device to be worn by the user, wherein the wearable device comprises: an enclosure for housing one or more electronic components, wherein the enclosure is connected to a band to enable wearing of the wearable device around a body part of the user, wherein the one or more electronic components are selected from: a display screen disposed on a top of the enclosure, wherein the display screen displays a multidimensional code; an input interface disposed on a side of the enclosure, wherein the input interface receives a SOS input to trigger a SOS signal; a geolocation determination unit determines a current geolocation of the wearable device; and a data transceiver to enable communication with a mobile terminal; and the mobile terminal: scans the multidimensional code to establish a persistence communication session between the mobile terminal and the wearable device; receives a user profile, wherein the user profile comprising at least one of: at least one emergency contact details of one or more recipients; a login credential; a medical record data; acquires the triggered SOS signal; and triggers an emergency notification to the one or more recipients, wherein the emergency notification comprising the determined current geolocation.

In an embodiment, the user profile is tagged with an order history comprising one or more placed orders, wherein each order is indexed, individually, with: a list of purchased products or services and a vendor thereof; a loyalty data corresponding to each of purchased product or service; and a payment data.

In an embodiment, the loyalty information is selected from the loyalty points, the discount coupons, or a membership status.

In an embodiment, the multidimensional code is a QR code that encodes information related to an identity of the user or medical information.

In an embodiment, the input interface is a button, a touch-sensitive surface, and a voice-activated unit.

In an embodiment, the emergency notification includes an audio data, a visual alert, or a vibration alert.

In an embodiment, the wearable device comprises a fall detection unit that automatically triggers the SOS signal.

In an embodiment, the SOS signal includes a pre-recorded audio message that is transmitted to the one or more recipients.

In an embodiment, the wearable device further includes a camera capable to capture multi-media data.

In an embodiment, a server arrangement analyzes the order history and flags a suspicious transaction.

In an embodiment, the server arrangement uses a machine learning algorithm to personalize one or more shopping suggestions based on the order history.

In an embodiment, the disclosure pertains to a method for assisting a user, the method comprising: arranging of one or more electronic components in an enclosure of a wearable device, wherein the enclosure is connected to a band to enable wearing of the wearable device around a body part of a user, wherein the one or more electronic components enable: displaying a multidimensional code on a display screen, wherein the display screen is disposed on a top of the enclosure; receiving a SOS input on a user interface, to trigger a SOS signal; determining a current geolocation of the wearable device; communication with a mobile terminal, through a data transceiver; scanning the multidimensional code, through the mobile terminal, to establish a persistence communication session between the mobile terminal and the wearable device; receiving a user profile, at the mobile terminal; acquiring the triggered SOS signal, at the mobile terminal; and triggering, through the mobile terminal, an emergency notification to the one or more recipients, wherein the emergency notification comprising the determined current geolocation.

In an embodiment, the wearable device generates and emits a unique sound to assist search and rescue teams in locating the user.

In an embodiment, the wearable device generates an augmented reality display to provide a guidance instruction to the user during emergencies.

In an embodiment, the multidimensional code is a QR code that encodes information related to an identity of the user or medical information.

In an embodiment, the input interface is a button, a touch-sensitive surface, and a voice-activated unit.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein.

Embodiments of the present disclosure will now be described, by way of example only, with reference to the following diagrams.

DETAILED DESCRIPTION OF EMBODIMENTS

Figure 1:
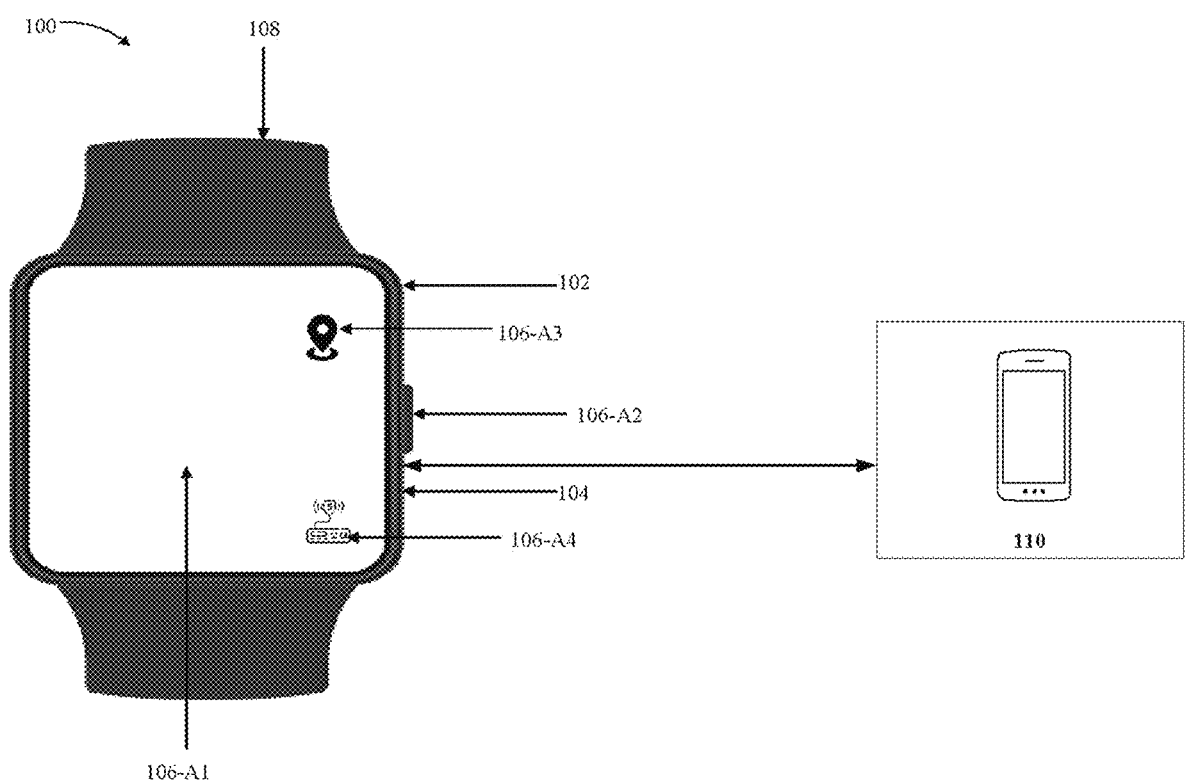
FIG. 1 illustrates a user assistance system, in accordance with the embodiments of the present disclosure.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

FIG. 1 illustrates a user assistance system 100 (interchangeably referred as system 100), in accordance with the embodiments of the present disclosure. The system 100 comprises a wearable device 102, a mobile terminal 110 and other known components. In an embodiment, the user assistance system 100 comprises the wearable device 102 that is worn by the user on a body part, facilitating constant proximity to the user for the purpose of providing assistance. The wearable device 102 comprises an enclosure 104, which can house one or more electronic components 106-A (individually referred as 106-A1, 106-A2, 106-A3, . . . 106-AN). The one or more electronic components 106-A provides computational power, sensory data processing, and connectivity features essential for the operation of the user assistance system 100.

In an embodiment, the enclosure 104 is fabricated from materials selected for durability, comfort, and a lightweight profile to ensure ease of use over extended periods. The enclosure 104 provides protection to the electronic components 106-A contained within, safeguarding against physical damage and environmental factors that could disrupt the functionality of the wearable device 102. In an embodiment, the enclosure 104 is connected to a band 108 that secures the wearable device 102 around the body part of the user. The band 108 is adjustable to accommodate various body sizes and shapes, ensuring that the wearable device 102 remains securely positioned during use. The band 108 is constructed from materials that offer a balance of flexibility and strength, allowing for a comfortable fit while preventing slippage or displacement of the wearable device 102.

In an embodiment, the wearable device 102 is made to be unobtrusive and ergonomically designed, allowing users to wear the wearable device 102 without hindrance to their daily activities. The contours and dimensions of the enclosure 104 are optimized to conform to the anatomy of the body part (e.g., wrist, finger, arm, ear, forearm, etc.) on which the wearable device 102 is to be worn, thereby enhancing the user experience through improved wearability.

In an embodiment, the electronic components 106-A housed within the enclosure 104 include, but are not limited to, a processor, memory, communication modules, sensors, and a power source. The processor can execute instructions from a set of executable routines stored within the memory, processing sensory data received from the sensors, and managing communications facilitated by the communication modules.

In an embodiment, the power source contained within the enclosure 104 supplies power to the electronic components 106-A. The power source (e.g., Lithium-Ion battery) can allow for recharging, incorporating safety mechanisms to protect against overcharging and power surges.

In an embodiment, the enclosure 104 comprises a display screen 106-A1 that is one of the one or more electronic components 106-A incorporated into the wearable device 102. The display screen 106-A1 presents information in a visually accessible manner, wherein the display screen 106-A1 exhibits a multidimensional code (e.g., QR code, barcode etc. shown as 408 in FIG. 4). The multidimensional code displayed by the display screen 106-A1 conveys data in a graphical format which can be easily scanned and interpreted by compatible reading devices. The multidimensional code can be a means through which the user can interface with various aspects of the user assistance system 100, facilitating seamless interactions within the ecosystem of the services of system 100. The placement and functional integration of the display screen 106-A1 within the wearable device 102 exemplify the approach to ergonomic and efficient design that the user assistance system 100 endeavors to provide, ensuring that information is readily available to the user with minimal effort and maximum convenience.

In an embodiment, the enclosure 104 comprises an input interface 106-A2 that is positioned on a side of the enclosure 104. The input interface 106-A2 receives an input signal indicative of an emergency condition, commonly referred to as an SOS input. Upon actuation by the user, the input interface 106-A2 initiates a sequence of operations collectively recognized as an SOS signal that facilitates rapid response actions, which may include but are not limited to, notifying emergency services, alerting pre-stored contacts, or activating location services to determine the geographic position of the user in distress. The inclusion of the input interface 106-A2 on the wearable device 102 ensures that assistance is readily accessible through a simple, user-activated mechanism, thereby enhancing the safety and well-being of the user in situations where immediate aid is required.

In an embodiment, the wearable device 102 comprises a geolocation determination unit 106-A3 to determine geolocation of the wearable device 102 by utilizing global positioning technology. The geolocation determination unit 106-A3 ensures that the wearable device 102 offers location-based services. The services include, but are not limited to, real-time user tracking for enhanced safety, historical visited location tracing, efficient navigational assistance, and the provision of geographically pertinent information. The geolocation determination unit 106-A3 delivers continuous locational updates aids to the functionality of the user assistance system 100. The geolocation determination unit 106-A3 enables the user assistance system 100 to deliver tailored support and information of the user, thereby enhancing the overall effectiveness and user experience of the system 100.

In an embodiment, the one or more electronic components 106-A includes a data transceiver 106-A4 that is selected to facilitate communication with the mobile terminal 110. The data transceiver 106-A4 is configured to transmit and receive data packets, thereby enabling a seamless exchange of information between the user assistance system 100 and the mobile terminal 110. The user assistance system 100 enables communication with the mobile terminal 110 for various functionalities that include, but are not limited to, transmitting notifications to the user, receiving user inputs, and exchanging operational data. The data transceiver 106-A4 ensures that the user assistance system 100 maintains a connectivity framework capable of supporting a multitude of communication protocols, which may include cellular, Wi-Fi, Bluetooth, NFC, or any combination thereof. The data transceiver 106-A4 upholds data integrity and security standards, ensuring that all communications between the user assistance system 100 and the mobile terminal are conducted in a secure and reliable manner, safeguarding user data against unauthorized access and breaches.

In an embodiment, the mobile terminal 110 performs a scanning operation on the multidimensional code. Upon successful scanning of the multidimensional code, the mobile terminal 110 is further configured to establish a persistent communication session with the wearable device 102. The persistent communication session is initiated and maintained by the mobile terminal 110 to facilitate continuous and uninterrupted data exchange between the mobile terminal 110 and the wearable device 102. The persistence of the communication session ensures that, once established, the session remains active, allowing for real-time interaction and data synchronization between the mobile terminal 110 and the wearable device 102, without the need for re-establishment of the communication link. The communication session thus provides a seamless user experience, whereby the functionality and services offered by the wearable device 102 can be accessed, controlled, or monitored via said mobile terminal 110.

In an embodiment, the mobile terminal 110 receives a user profile, which may include, variety of information such as personal information pertinent to the security and health of user. Among the data received by the mobile terminal 110, at least one emergency contact detail (e.g., email address, mobile number, social media account details etc.) is included for one or more designated recipients (e.g., caregiver, doctor, nurse, family member, community center, etc.) ensuring that in the event of an emergency, communication can be established to facilitate immediate assistance. Additionally, the user profile is structured to encompass login credentials, which are essential for securing user access and maintaining the integrity of the system 100 and the privacy of the data contained therein. Furthermore, the user profile includes medical record data (e.g., co-morbid disease condition, allergic information, current medication intake etc.), which is paramount in instances where medical intervention is required, allowing healthcare professionals rapid access to vital health information that can inform treatment decisions. The collected data within the user profile is integral to the functionality of the user assistance system 100, enabling the mobile terminal 110 to act as a touchpoint in the provision of user assistance.

In an embodiment, upon activation by user, the SOS signal, being a predetermined communication initiated during instances of emergency or distress, is captured by the mobile terminal 110. The mobile terminal 110, upon acquisition of the SOS signal, engages in a series of predefined operations aimed at facilitating rapid and effective assistance. The predefined operations may include, but are not limited to, transmitting the SOS signal to designated emergency contacts, emergency services, and/or other entities within a response network. Additionally, the mobile terminal 110 collates and transmits ancillary data pertinent to the emergency situation, which may encompass the geographical location of the mobile terminal 110, the timestamp at which the SOS signal was triggered, as well as any other contextual information that may be preconfigured by the user or inferred by the system 100. The transmission of aforesaid data is executed via established communication networks, ensuring that the SOS signal, along with the accompanying data, is relayed promptly and securely. Furthermore, the mobile terminal 110 may initiate additional protocols concurrently with the transmission of the SOS signal, including the activation of audio and visual signals to attract attention or to deter threats in the vicinity of the user. The integrated functionalities of such mobile terminal 110 coalesce to form a response framework within the user assistance system 100, providing an efficient mechanism for users to signal distress and obtain assistance with heightened efficacy and reliability.

In an embodiment, upon activation, the mobile terminal 110 dispatches an emergency notification to one or more predetermined recipients. The content of the emergency notification includes, but may not be limited to, the current geolocation, which is ascertained by the wearable device 102 and mobile terminal 110 at the time of the emergent event. The geolocation data is determined through the utilization of geolocation determination unit 106-A3, ensuring that the coordinates are captured and relayed. Such features are vital for providing immediate and accurate locational information during crisis situations, thereby facilitating prompt response and assistance. The process by which the emergency notification is generated and disseminated is automated, requiring minimal user interaction, which is of paramount importance in situations where the user may be incapacitated or otherwise hindered from manually transmitting alerts.

In an embodiment, the user assistance system 100 may include the user profile that is tagged with an order history that comprises one or more placed orders. Each of the orders is indexed individually with a list of purchased products or services along with the respective vendor of each product or service. Further included in each order is loyalty data corresponding to each of the purchased products or services. Additionally, payment data associated with each of the orders is recorded. The loyalty data may include points accrued, membership status, or other vendor-specific loyalty metrics that are pertinent to the engagement of user with the vendor. The payment data may encompass the transaction amounts, chosen payment methods, transaction dates, and other relevant financial details that facilitate a view of the purchasing activities of the user. The amalgamation of indexed order history, loyalty data, and payment data in the user profile enables a tailored user experience, allowing for enhanced customer service and personalized marketing opportunities by the user assistance system 100.

In an embodiment, the loyalty information may be characterized by comprising at least one selected from the group consisting of: loyalty points indicative of a value accumulated based on previous transactions or interactions; discount coupons which are applicable to future transactions and may be redeemed for goods, services, or advantageous financial terms; and membership status reflecting the current standing of user within a loyalty program, said status affording the user preferential access to services, promotions, or information. The loyalty information is stored, managed, and updated within the system 100, wherein upon authentication of the user, the loyalty information is retrieved and utilized to customize the user experience, offering personalized incentives and enhancing user engagement with the system 100. The system 100 interacts with the mobile terminal 110 to ensure real-time accuracy and relevance of the loyalty information presented to the user, thereby fostering a seamless and customized interaction with the system 100 based on the loyalty-related data of user.

In an embodiment, the multidimensional code may be implemented as a quick response (QR) code, which encodes information pertinent to the user utilizing the system 100. The QR code may incorporate name, contact information, and any identifying numbers or credentials that may be utilized to uniquely distinguish the user. In addition, the QR encodes medical information of user. Such medical information can range from the medical history of user, including past diagnoses and treatments, to current medical conditions that may require immediate attention or consideration, such as allergies, ongoing medications, or specific medical directives that are essential in emergency situations. The encoded information within the QR code can be readily accessed and deciphered by the mobile terminal 110, thereby facilitating rapid identification and the provision of personalized assistance. The aforementioned feature of the user assistance system 100 ensures that in instances where the user is unable to communicate effectively, or identification is otherwise impeded, the essential information can still be obtained through the scanning of the QR code by the mobile terminal 110. The QR code thus serves as a secure and efficient means of storing and transmitting sensitive user information, which can be imperative in providing timely and accurate support to the user by first responders, medical personnel, or any other entities requiring access to the personal or medical data of user.

In an embodiment, the input interface 106-A2 may be selected from a button, a touch-sensitive surface, and a voice-activated unit (comprising microphone and speech-to-text conversion unit). The button may be integrated into the user assistance system 100 to enable tactile engagement by users, providing a simple and effective means for initiating interaction with the system 100. Additionally, the touch-sensitive surface may be incorporated to capture gestures and touches, facilitating a responsive user input method that accommodates a range of commands and controls. The touch-sensitive surface can recognize varying degrees of pressure and patterns of touch, thereby allowing for a diverse array of input possibilities. Complementing the tactile components of the input interface 106-A2, the voice-activated unit interprets auditory signals from users. The voice-activated unit employs advanced speech recognition algorithms that are capable of processing natural language commands and converting them into operational directives for such user assistance system 100. The voice-activated unit detects spoken words, phrases, and queries, enabling hands-free operation, and offering an accessible mode of interaction for users. The incorporation of the voice-activated unit is beneficial in scenarios where manual interaction is impeded or impractical.

In an embodiment, the emergency notification may employ a multimodal alert system, providing notifications through audio data, visual representation, and vibration alert, each serving to ensure that the recipient receives a prompt and clear indication of an emergency. The audio alert is configured to emit a distinct sound at a volume calculated to capture the attention of user even in a noisy environment. Concurrently, the visual alert is manifested in the form of flashing lights or on-screen messages displayed on the mobile terminal 110 to be discernible even at a distance or in bright conditions. Additionally, the vibration alert provides a tactile warning through rhythmic or pulsating vibrations, which can be particularly effective in scenarios where the user may not be able to rely on auditory or visual alerts, such as in loud surroundings or in situations where visual attention is focused elsewhere. The combination of the alert modalities ensures an efficient mechanism for conveying emergency notifications, thereby enhancing the safety and responsiveness of the user.

In an embodiment, the wearable device 102 may comprise a fall detection unit that is arranged to autonomously monitor the stability and orientation of user. Upon detection of a fall, characterized by a sudden change in altitude and orientation indicative of a user becoming prone, the fall detection unit initiates an SOS signal. The activation of the SOS signal is immediate, ensuring prompt communication of the emergency. Once activated, the SOS signal is transmitted to the mobile terminal 110, which is operatively coupled to the wearable device 102. The mobile terminal 110, upon receipt of the SOS signal, proceeds to execute a series of predefined actions, which may include, but are not limited to, alerting emergency services, notifying predefined contacts within the personal network of user, and providing location data that is crucial for expedited assistance. The execution of the actions by the mobile terminal 110 is conducted in a manner that prioritizes urgency and accuracy, thereby enhancing the safety and security of the user in situations where the user may be incapacitated and unable to manually seek assistance.

In an embodiment, the SOS signal may be generated by the mobile terminal 110, which includes a pre-recorded audio message stored within the memory of the mobile terminal 110. Upon activation of the SOS signal by the user, the pre-recorded audio message is transmitted to a plurality of pre-designated emergency contacts/recipients. The transmission of the pre-recorded audio message is facilitated by a data transceiver 106-A4 of the mobile terminal 110, wherein the data transceiver 106-A4 communication module is interfaced with various communication networks to ensure transmission of the SOS signal. The transmission ensures that the emergency contacts/recipients are alerted to the distress situation of user. The system 100 further ensures that the transmission of the SOS signal is executed with the highest priority over other communications to expedite the delivery of the pre-recorded audio message to the intended recipients, thus enhancing the responsiveness and effectiveness of the user assistance system 100.

In an embodiment, the wearable device 102 may comprise a camera for capturing multi-media data (e.g., photographic and video content). The captured content can be transmitted to the mobile terminal 110. The transmission of the visual content from the wearable device 102 to the mobile terminal 110 enables the user to share visual data, thereby enhancing utility of the user assistance system 100. The visual content, once transmitted to the mobile terminal 110, can be further processed, analyzed, or stored, depending on user requirements.

In an exemplary embodiment, the system 100 can comprise a server arrangement (depicted as 304 in FIG. 3) that can enhance security and reliability of financial transactions by analyzing order history and identifying suspicious transactions. The server arrangement can include data analysis tools (e.g., machine learning and artificial intelligence) to recognize patterns typical of legitimate transactions and those indicative of fraudulent activities. The server continuously receives and analyzes data (e.g., transaction amount, frequency, geographical location, and other relevant metadata) related to new transactions, comparing them against the order history of the account in question. If a transaction significantly deviates from established patterns in the order history, the server can flag particular transaction as suspicious and trigger notification to user/financial institution/vender/payment gateway etc.

The system 100 can also be configured to take automatic actions, like freezing the account or transaction, initiating refund request, and the like. The system 100 can enable enhancement of transaction security, by analyzing order history to identify anomalies, thereby reducing the risk of fraudulent transactions.

In an aspect, the server arrangement can utilize machine learning algorithms to provide personalized shopping suggestions based on order history to improve shopping experience. The machine learning algorithms can identify preferences and habits by examining past purchases, including product types, brands, purchase frequency, and spending patterns. Based on the analysis, the machine learning algorithm generates shopping suggestions tailored to the user's preferences and habits. The personalized shopping suggestions enhance user experience and boosts vendor revenue.

In an embodiment, the wearable device 102 can be equipped with a sound-generating unit (e.g., speaker) to generate sound that can be easily recognizable and distinguishable from ambient noises. The sound is customized to carry over long distances and through various terrains, ensuring that sound can be heard by search and rescue team. The sound generation can be activated manually by the user in an emergency or automatically triggered under certain conditions, such as when the user is immobile for an extended period or when the device detects a fall. The sound pattern can be customized based on the user's profile or the nature of the emergency, providing specific information to the rescuers about the situation.

In another aspect, the wearable device 102 includes an AR display mechanism, which can be a built-in screen or a projection unit that interfaces with smart glasses or similar technology. The AR display provides visual guidance instructions, for an instance. e.g., navigation aid to the nearest exit in a building, the location of emergency resources, or instructions for self-help in medical emergencies. The AR display offers a more intuitive and effective way for users to understand and follow emergency instructions.

Figure 2:
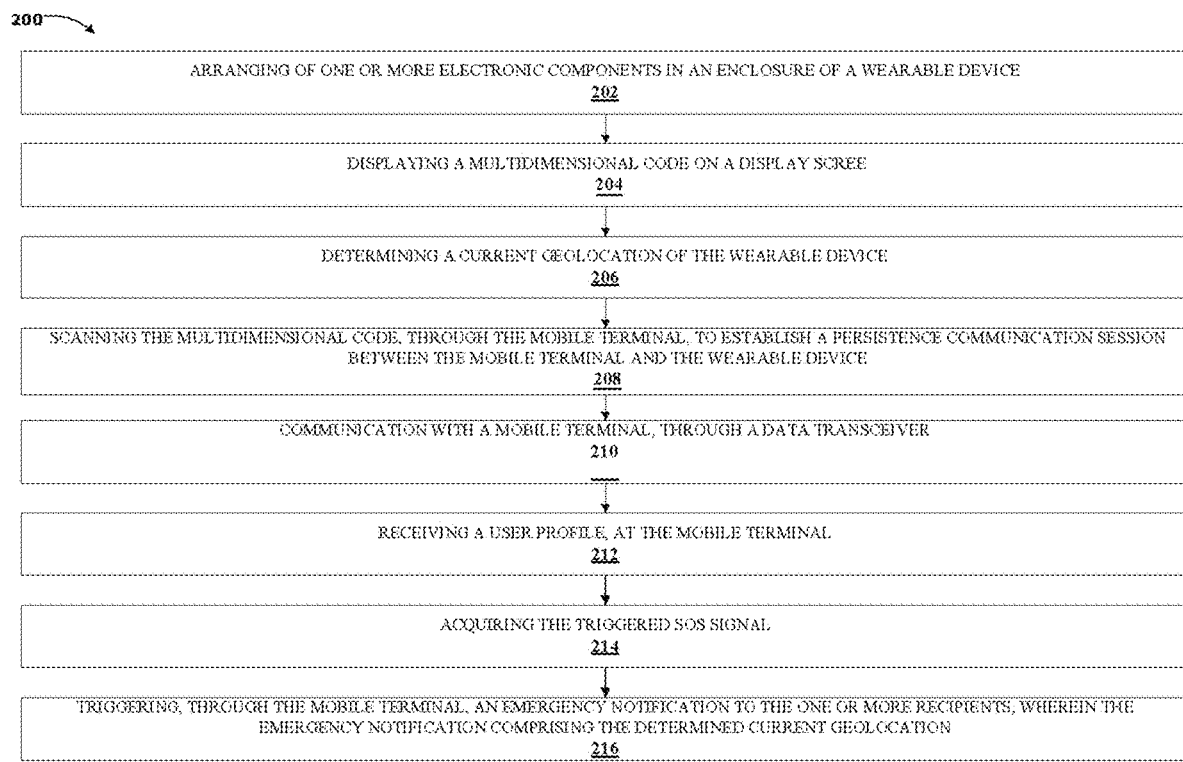
FIG. 2 illustrates a method for providing user assistance through a user assistance system comprising a wearable device and a mobile terminal, in accordance with the embodiments of the present disclosure.

FIG. 2, illustrates the flow diagram of method 200 for assisting a user using a wearable device, in accordance with embodiment of present disclosure. The step 210 involves placing various electronic components within enclosure 104 of the wearable device 102, which can be worn around a body part, like a wrist, facilitated by a band. The step 204 involves displaying a multidimensional code (e.g., QR code) on a display screen of the wearable device 102. The screen is disposed on a top of the enclosure 104. The multidimensional code can be used for various purposes, including pairing of wearable device 102 or information sharing.

The step 206 comprises receiving, through user interface (e.g., button, touch sensitive screen etc.) an SOS signal input from user. The user can trigger SOS signal for emergency situations to provide a quick distress signal. The step 208 involves determination of geolocation of wearable device 102 GPS or similar technology. The determined geolocation would be vital for emergency situations.

At step 208, user can use a mobile terminal 110 (e.g., smartphone) to scan the displayed multidimensional code on the wearable device 102, for establishing a persistent communication session. Scanning of multidimensional code can be used for a variety of purposes, including initial setup or emergency services. At step 210, wearable device 102 communicates with mobile terminal 110 via a data transceiver 106-A4 to enable exchange of data (e.g., determined geo location) and control commands (e.g., SOS command).

The step 212 involves receiving a user profile, at the mobile terminal 110. The user profile includes essential information such as emergency contact details of one or more recipients, login credentials, and relevant medical record data.

The step 216, the mobile terminal 110 captures and processes the triggered SOS signal from the wearable device 102, recognizing the urgency of the situation. At step 218, utilizing the acquired information, the mobile terminal 110 promptly triggers an emergency notification. The emergency notification includes details such as the determined current geolocation of the wearable device 102. The emergency notification is then transmitted to the designated recipients, ensuring swift response and assistance.

Figure 3:
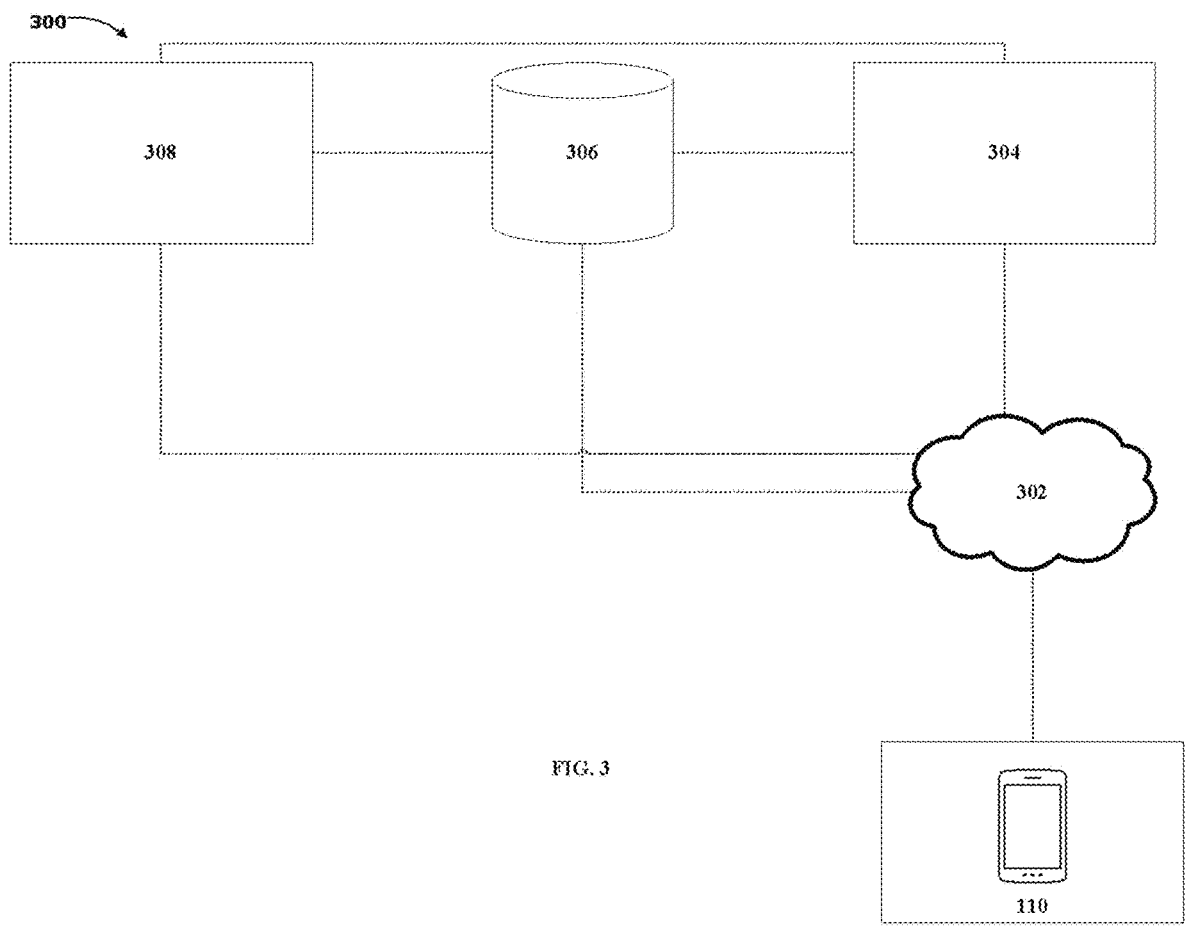
FIG. 3 illustrates a block diagram of a system for providing assistance to a user, in accordance with another embodiment of the present disclosure.

FIG. 3 illustrates a block diagram of a system 300 for providing an assistance to a user, in accordance with another embodiment of the present disclosure. The system 300, incorporates the wearable device 102 and the mobile terminal 110 (same as FIG. 1) and operatively couples with a third-party server arrangement 304, through internet-based long-range wireless communication. The server arrangement 304 is associated with vendors offering various products and services. The server arrangement 304 conveys promotional material to the wearable device 102, thus personalizing the user experience with relevant sales and discount information.

In an embodiment, the third-party server arrangement 304 manages loyalty information derived from the past transactions of user. By processing purchase-related data received from the wearable device 102, the third-party server arrangement 304 computes loyalty points that are then relayed back to the user, reflecting their accrued benefits. The loyalty information encompasses data such as total loyalty points and current membership status, which is subsequently made available upon request.

In embodiment, a database arrangement 306 serves as a repository for a user profile that includes personal, medical, and emergency recipient/contact information. Database arrangement 306 is continually updated with any changes, such as alterations to security PINs, made through the mobile terminal 110. The database arrangement 306 also tracks loyalty information related to the dealings of user with multiple vendors, updating the loyalty point tally after each transaction.

In an embodiment, the system 300 comprises a server arrangement 308, which is in communication with the wearable device 102 and the mobile terminal 110. The server arrangement 308 processes the current location of user that is important for identifying the locale vendor and current shopping information, such as items added to a digital shopping cart. The server arrangement 308 calculates updated billing costs by considering the loyalty information, leading to discounted prices at the point of sale, which are then communicated back to the mobile terminal 110 and displayed on the wearable device 102 as a QR code for easy scanning and payment.

Figure 4:
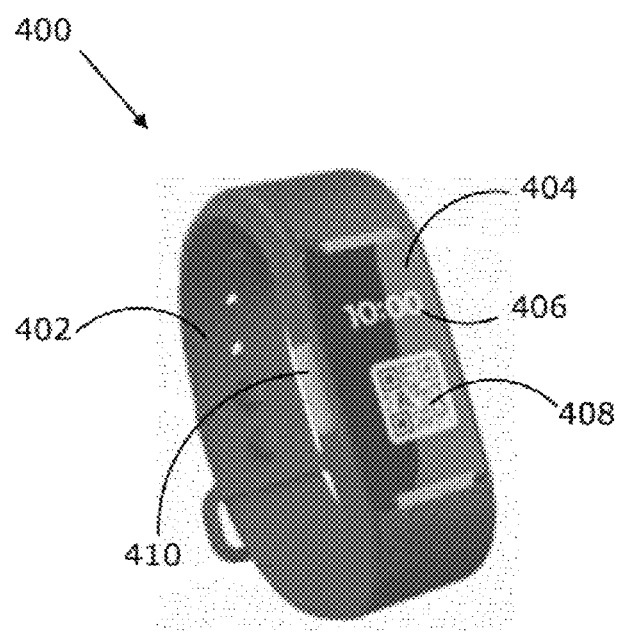
FIG. 4 illustrates a perspective view of a wearable monitoring device, in accordance with an embodiment of the present disclosure.

FIG. 4 illustrates a perspective view of a wearable monitoring device 400 (that is the wearable device 102 of FIG. 1), in accordance with an embodiment of the present disclosure. The wearable monitoring device 400, as depicted, integrates a wrist band 402 (that is band 108 in FIG. 1), which fits to the user's body part comfortably, thereby allowing for ease of wearability of the wearable monitoring device 400. In addition to the band 402, the wearable monitoring device 400 comprises an light emitting diode (LED) display 404 (identifiable as display screen 106-A1 from FIG. 1), which serves the dual purpose of showing the current time 406 and a unique code 408, the latter of which can be used for various authentication or identification purposes. The LED display 404 thus acts as a convenient interface for the wearer, presenting essential information briefly. Complementing the features is an emergency button 410 (that is the input interface 106-A2 shown in FIG. 1), which provides users with a quick and efficient way to signal distress. The emergency button 410 is indicative of the utility of wearable monitoring device 400 in critical situations, allowing the wearer to activate an emergency protocol (such as SOS signal) with a single press. Such a feature is particularly invaluable in circumstances where immediate assistance is required, ensuring that users have a readily accessible means to alert others when in need.

Figure 5:
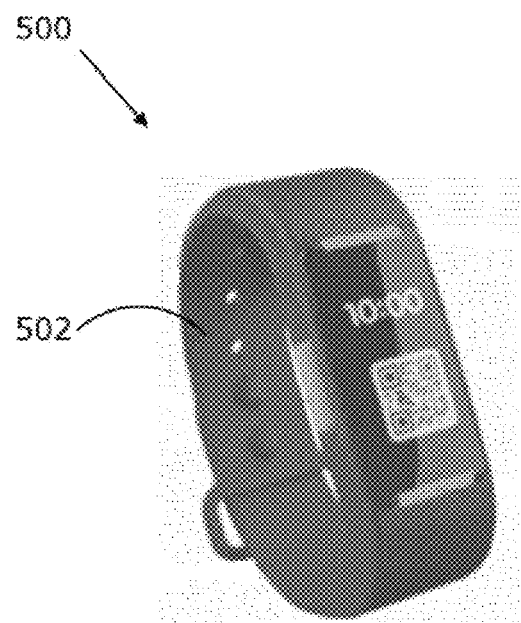
FIG. 5 depicts a perspective view of a smart band, in accordance with an embodiment of the present disclosure.

FIG. 5 depicts a perspective view of a smart band 500 (such as the wearable monitoring device 400 of FIG. 4 and the wearable device 102 of FIG. 1), in accordance with an embodiment of the present disclosure. As depicted, the smart band 500 comprises a detachable band 502, featuring a mechanism that allows smart band 500 to be opened, thereby facilitating the ease of removing the smart band 500, as required. This ensures that the smart band 500 can be securely fastened around the wrist or other body parts, and equally conveniently removed, catering to the need of user for flexibility and comfort. The detachable nature of band 502 enhances the user experience by allowing for quick and effortless adjustments to fit and enables the possibility of customizing or replacing the band 502 entirely, without needing to replace the entire detachable band 502. Such features are particularly advantageous for users who may wish to interchange bands of different colors or materials to match their personal style or for specific activities, thereby extending the versatility and functional appeal of the smart band 500.

Figure 6:
FIG. 6 depicts an exploded view of the smart band, in accordance with an embodiment of the present disclosure.

FIG. 6 depicts an exploded view of the smart band 500 shown in FIG. 5, in accordance with an embodiment of the present disclosure. The smart band 500, as depicted, features an enclosure 504 (that is the enclosure 104 presented in FIG. 1) that is arranged to house the electronic components 106-A of smart band 500. Atop the enclosure 504, liquid crystal display (LCD) display 506, (such as the LCD display 404 and display screen 106-A1), serves as the visual interface for the user. The LCD display 506 is positioned for optimal visibility and ease of interaction. Complementing the visual component, the smart band 500 comprises an emergency button 508 (that is emergency button 410 and input interface 106-A2), which is integrated into the right side of the enclosure 504. The placement of the emergency button 508 ensures the accessibility in urgent situations, enabling the wearer to initiate an emergency protocol (that is SOS signal) with a simple press. The smart band 500 provides visual output through the LCD display 506 and user input via the emergency button 508, to provide a seamless and intuitive user experience.

Figure 7A:
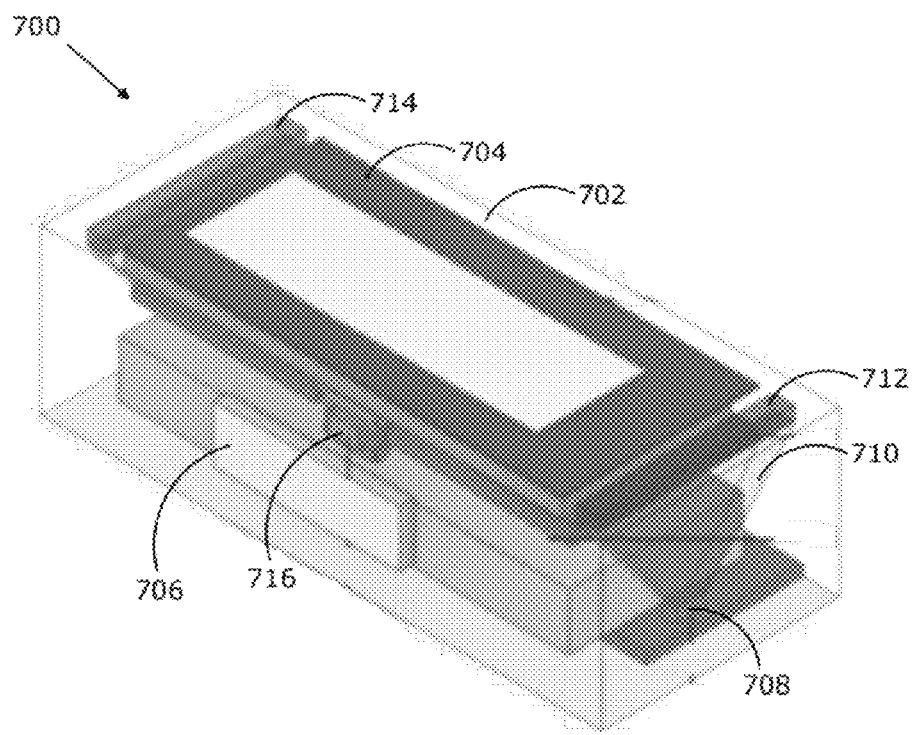
FIG. 7 (FIG. 7A to FIG. 7B) shows a perspective view of an enclosure, in accordance with an embodiment of the present disclosure.
Figure 7B:
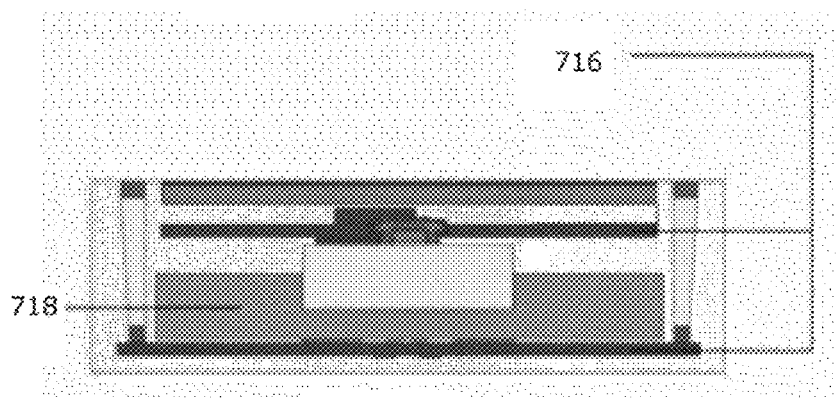

FIG. 7 (FIG. 7A to FIG. 7B) shows a perspective view of an enclosure 700 (such as the enclosure 504 of FIG. 6 and the enclosure 104 presented in FIG. 1), in accordance with an embodiment of the present disclosure. The enclosure 700, as depicted, includes an outer casing 702 constructed from materials such as plastic, which serves to house the electronic components 106-A of a wristband (such as the smart band 500 illustrated in FIGS. 5-6), effectively ensuring both water and airtight protection. Integral to the enclosure 700 are components 106-A such as an LCD display 704 (such as LCD display 506, the LCD display 404 and display screen 106-A1) and an emergency button 706 (such as emergency button 508, emergency button 410 and input interface 106-A2), which facilitates user interaction and display functionalities. In addition, the enclosure 700 comprises an LED 708 that, in conjunction with a light guide 710, creates an illuminated band 712 situated below the LCD display 704, as well as an illuminated band 714 positioned above the LCD display 704, enhancing the visibility and aesthetics of the wristband. The enclosure 700 also integrates a printed circuit board 716, which is operationally connected to the emergency button 706. Such connection is vital in activating the functionality of the emergency button 706, allowing users to initiate an emergency protocol, when necessary.

Figure 8:
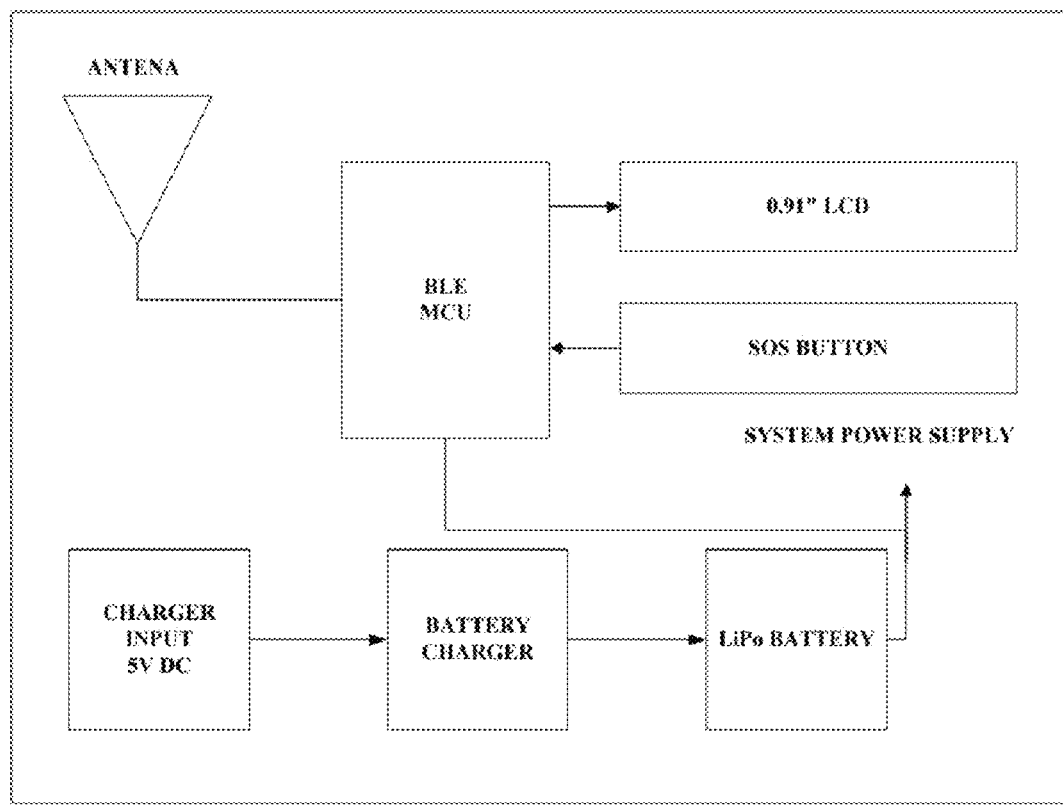
FIG. 8 illustrates a block diagram illustrating electrical communication within a wristband, in accordance with an embodiment of the present disclosure.

FIG. 8 illustrates a block diagram 800 illustrating electrical communication within a wristband (such as the smart band 500 of FIG. 5, the wearable monitoring device 400 of FIG. 4 and the wearable device 102 of FIG. 1), in accordance with an embodiment of the present disclosure. The configuration indicates that a 5V DC input electrical supply is directed to a battery charger (such as, through wall-mounted electrical supply), which is responsible for charging a lithium polymer (LiPo) battery 718. Subsequently, the electrical charge accumulated within the LiPo battery 718 is distributed via the power source to various components 106-A including an emergency button 706 (such as emergency button 508, emergency button 410, and input interface 106-A2), an LCD 704 (such as, LCD display), and a data transceiver 106-A4. The configuration ensures that the emergency button facilitates quick user response in exigent situations, while the LCD display 704 maintains the function to exhibit vital user information. Additionally, the data transceiver 106-A4 handles wireless communication requirements.

Figure 9A:
FIG. 9A-9J illustrates the various graphical user interfaces (GUIs) associated with an application for providing assistance to a user, in accordance with an embodiment of the present disclosure.
Figure 9B:
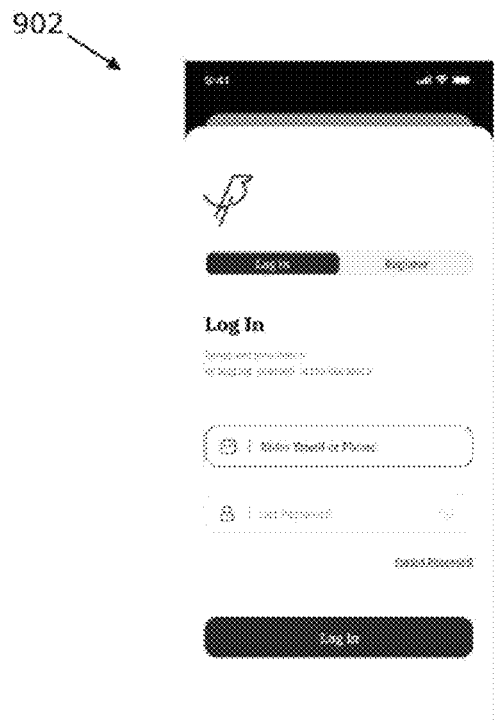
Figure 9C:
Figure 9D:
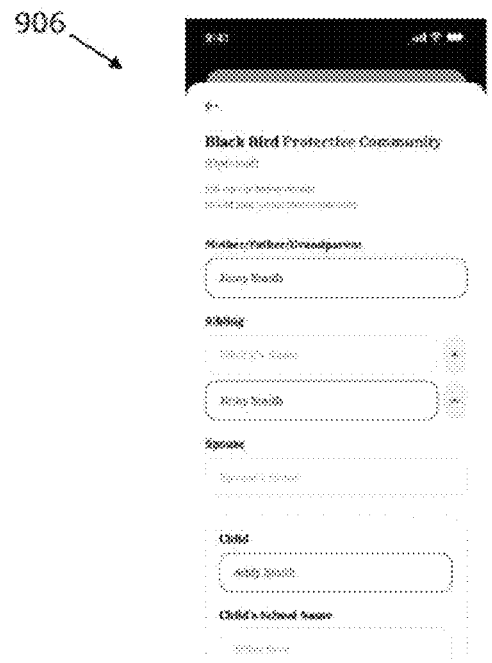
Figure 9E:
Figure 9F:
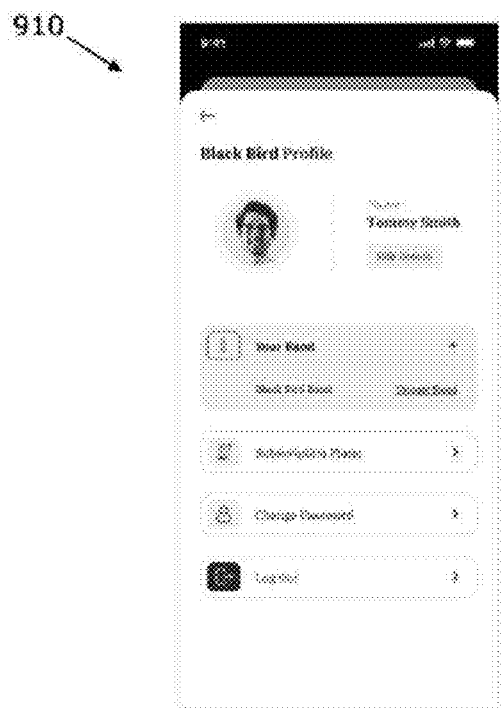
Figure 9G:
Figure 9H:
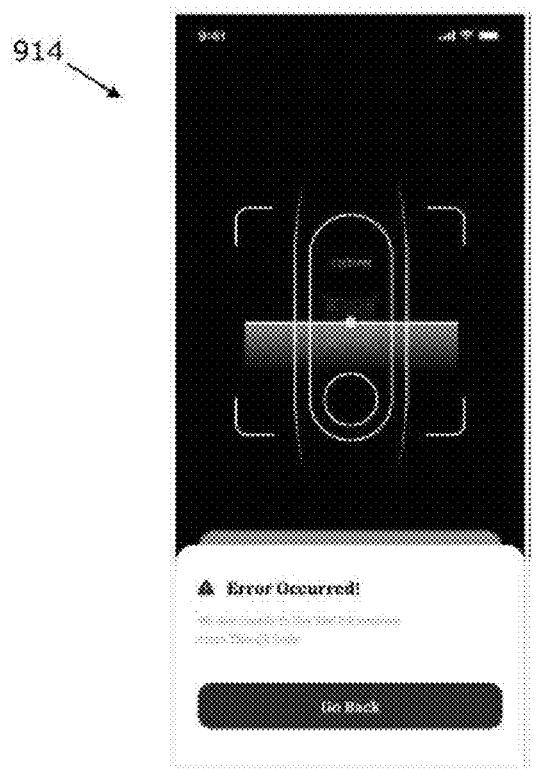
Figure 9I:
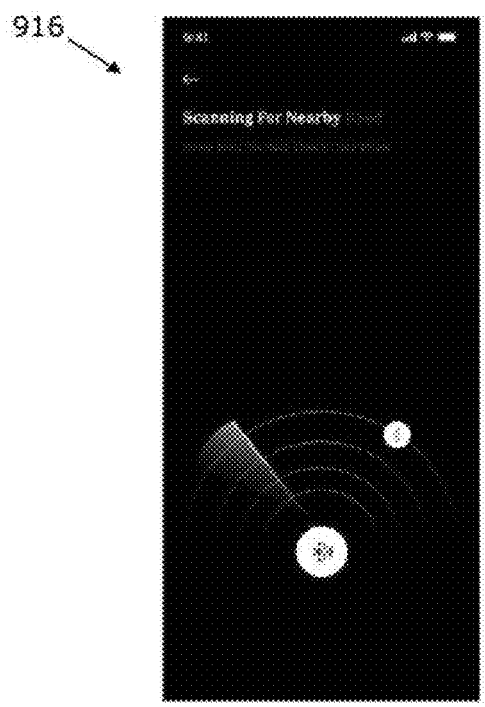
Figure 9J:
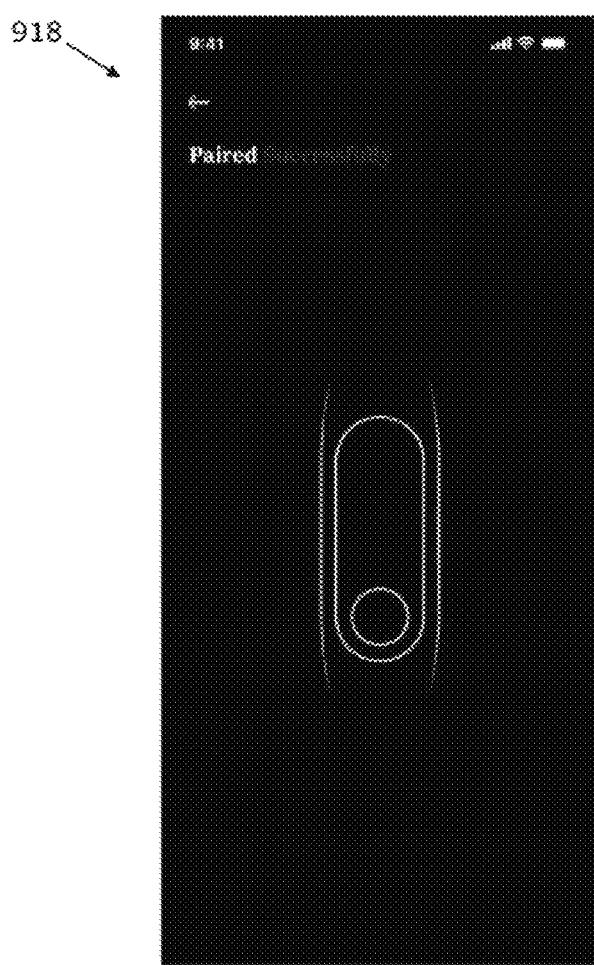

FIG. 9A-9J illustrates the various graphical user interfaces (GUIs) 900-918 associated with an application for providing an assistance to a user, in accordance with an embodiment of the present disclosure. The disclosed application (interchangeably referred as app), exemplified on a mobile device such as the mobile terminal 110 depicted in FIGS. 1, offers a graphical user interface (GUI) 900 as illustrated in FIG. 9A, which enables users to register for the app. Upon completion of registration, the users log-in into their accounts via GUI 902, as delineated in FIG. 9B. The application facilitates the entry of user details through GUIs 904 and 906, as seen in FIGS. 9C and 9D, respectively. The information entry culminates the creation of user profiles, which are displayed as profile 908 and 910 in FIGS. 9E and 9F. Following the establishment of their profiles, users are presented with the option to subscribe to a membership plan through GUI 912, showcased in FIG. 9G. Post subscription, users can pair their smart wristband with the mobile terminal utilizing a BLE connection and the interactive steps provided by GUIs 914-918 as seen in FIGS. 9H-9J. Such sequence of interfaces guides the user from initial engagement with the application to the full integration of their wearable device 102, enhancing the user experience and the utility of the system.

In an aspect, present disclosure provides a computer-readable storage medium is equipped with data and instructions, which, upon execution, perform method 200 designed to assist a user. The method 200 encompasses a series of steps executed by a processor coupled to a non-transitory storage device. The method 200 involves the utilization of multiple electronic components 106-A1 situated in the enclosure 104 of the wearable device 102. This enclosure is connected to a band, enabling the device to be worn around a user's body part. The electronic components 106-A1 are configured to enable several functionalities.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A user assistance system, the system comprising:
a wearable device to be worn by the user, wherein the wearable device comprises:
an enclosure for housing one or more electronic components, wherein the enclosure is connected to a band to enable wearing of the wearable device around a body part of the user, wherein the one or more electronic components are selected from:
a display screen disposed on a top of the enclosure, wherein the display screen displays a multidimensional code;
an input interface disposed on a side of the enclosure, wherein the input interface receives a SOS input to trigger a SOS signal;
a geolocation determination unit determines a current geolocation of the wearable device; and
a data transceiver to enable communication with a mobile terminal; and
the mobile terminal:
scans the multidimensional code to establish a persistence communication session between the mobile terminal and the wearable device;
receives a user profile, wherein the user profile comprising at least one of:
at least one emergency contact details of one or more recipients;
a login credential;
a medical record data;
acquires the triggered SOS signal; and
triggers an emergency notification to the one or more recipients, wherein the emergency notification comprising the determined current geolocation.

2. The user assistance system of claim 1, wherein the user profile is tagged with an order history comprising one or more placed orders, wherein each order is indexed, individually, with:
a list of purchased products or services and a vendor thereof;
a loyalty data corresponding to each of purchased product or service; and
a payment data.

3. The user assistance system of claim 1, wherein the loyalty information is selected from the loyalty points, the discount coupons, or a membership status.

4. The user assistance system of claim 1, wherein the multidimensional code is a QR code that encodes information related to an identity of the user or medical information.

5. The user assistance system of claim 1, wherein the input interface is a button, a touch-sensitive surface, and a voice-activated unit.

6. The user assistance system of claim 1, wherein the emergency notification includes an audio data, a visual alert, or a vibration alert.

7. The user assistance system of claim 1, wherein the wearable device comprises a fall detection unit that automatically triggers the SOS signal.

8. The user assistance system of claim 1, wherein the SOS signal includes a pre-recorded audio message that is transmitted to the one or more recipients.

9. The user assistance system of claim 1, wherein the wearable device further includes a camera capable to capture multi-media data.

10. The user assistance system of claim 1, comprising a server arrangement to analyze the order history and flags a suspicious transaction.

11. The user assistance system of claim 1, wherein the server arrangement uses a machine learning algorithm to personalize one or more shopping suggestions based on the order history.

12. A method for assisting a user, the method comprising:
arranging of one or more electronic components in an enclosure of a wearable device, wherein the enclosure is connected to a band to enable wearing of the wearable device around a body part of a user, wherein the one or more electronic components enable:
displaying a multidimensional code on a display screen, wherein the display screen is disposed on a top of the enclosure;
receiving a SOS input on a user interface, to trigger a SOS signal;
determining a current geolocation of the wearable device;
scanning the multidimensional code, through the mobile terminal, to establish a persistence communication session between the mobile terminal and the wearable device;
communication with a mobile terminal, through a data transceiver;
receiving a user profile, at the mobile terminal;
acquiring the triggered SOS signal, at the mobile terminal; and
triggering, through the mobile terminal, an emergency notification to the one or more recipients, wherein the emergency notification comprising the determined current geolocation.

13. The method of claim 12, wherein the wearable device generates and emits a unique sound to assist search and rescue teams in locating the user.

14. The method of claim 12, wherein the wearable device generates an augmented reality display to provide a guidance instruction to the user during emergencies.

15. The method of claim 12, wherein the multidimensional code is a QR code that encodes information related to an identity of the user or medical information.

16. The method of claim 12, wherein the input interface is a button, a touch-sensitive surface, and a voice-activated unit.

* * * * *